3,522,055
METHOD FOR PREPARING CARBONATED DRINKS

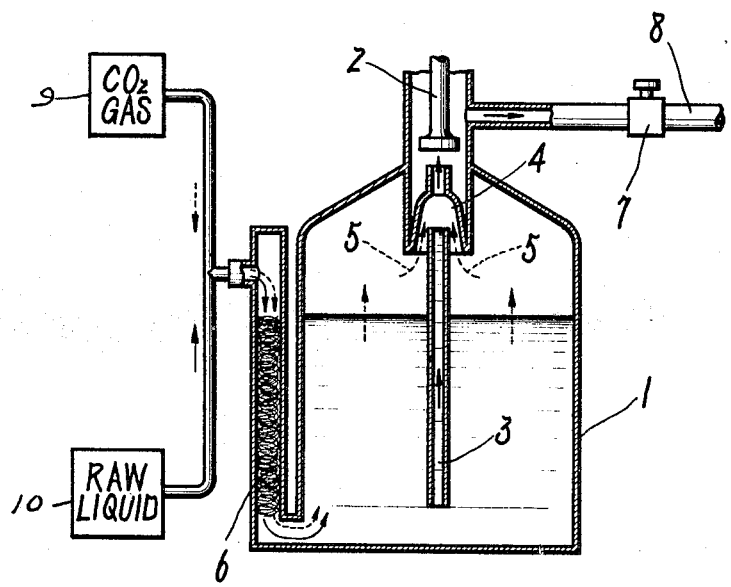

Shigeru Hayakawa, 2726 Kichijoji, Musashino-shi, Tokyo, Japan
Continuation-in-part of application Ser. No. 301,995, Aug. 14, 1963. This application Sept. 21, 1965, Ser. No. 488,926
Claims priority, application Japan, Aug. 27, 1962, 37/35,273
Int. Cl. A23l *1/00*
U.S. Cl. 99—79                              2 Claims

ABSTRACT OF THE DISCLOSURE

A deaerated liquid is saturated with carbon dioxide gas. The gas-saturated liquid is then forcibly mixed with pressurized carbon dioxide gas. The resulting mixture is forced as a jet against a supersonic vibration element.

---

This invention relates to an improved method of preparing carbonated drinks through the application of supersonic waves.

The present application is a continuation-in-part of my co-pending application Ser. No. 301,995 filed Aug. 14, 1963 now abandoned.

The method of the present invention of prepairing carbonated drinks operates by causing the liquid to absorb carbon dioxide gas by subjecting the liquid to the motion of supersonic waves which causes the liquid to be broken up into very small particles diffused into the gas.

An improvement, with a view to gaining more efficient absorption, has developed the manner in which supersonic waves aid in the absorption of carbon dioxide gas by the liquid, and provides means by which a liquid is made to be saturated with carbon dioxide gas in such a way that (1) the liquid can be kept in reservoirs and not subjected to any material pressure and (2) the gas-saturated state is maintained for a long period of time even when the lids or caps of the reservoirs are removed and the liquid is allowed to stand uncovered in the air.

The sole figure shows an apparatus suitable for practicing the invention.

When supersonic waves are generated in a liquid by means of a quartz or a magneto-striction vibration element, so that cavitation occurs, then cavities containing vapor are produced in the liquid at the moment when the supersonic field bears negative pressure. These cavities collapse with the condensation of the vapor when the supersonic field bears positive pressure. At the moment of collapse, the liquid particles on the liquid face of the cavity collide violently at high velocity, and stop suddenly but irregularly. Therefore, an extremely high pressure is caused locally in the liquid by the force of the liquid's kinetic inertia. If the liquid were assumed to be incompressible, this pressure would be infinitely great. Actually, however, it is thought to be about 10 atmospheres since any real liquid is compressible to a certain degree and since a liquid normally contains air.

When cavitation is caused, not in a normal simple liquid, but in a liquid in which carbon dioxide gas has been absorbed by forcing carbon dioxide gas under pressure into the liquid, the vaporization-condensation cycle is repeated over and over, and a violet breaking action is effected on the liquid particles. The very small particles of carbon dioxide in the liquid which consists of small numbers of carbon dioxide molecules are absorbed in a filmy state on the surface of the liquid particles. Thus a kind of colloid which consists of liquid and gas particles is formed. It is for this reason that the absorption of carbon dioxide gas is excellent when supersonic waves are used. However, in the preparation of carbonated drinks, it has not been possible to completely stabilize the absorbed carbon dioxide even through the use of Experiments have been made to determine the way in which the vibrator element is affected by the ambient liquid both when the liquid is under normal atmospheric pressure and when it is under a greater pressure. The results of this experiment are shown in Table I. This table shows the amplitude of a vibrator element's radiation plate in microns for various vibrator power input levels.

In the drawing, 1 is a closed container provided with a supersonic vibration element that is a vibration horn 2, and an upright pipe 3 in which the gas saturated liquid passes to a jet pump portion 4 in which pump portion the emitting liquid from the pipe 3 is mixed with additional pressurized carbon dioxide gas 5 passing through the gas-saturated liquid 11 in the container 1 and accumulated above the liquid level 12. Said passing of gas through the liquid is caused by charging said gas from the carbon dioxide gas source 9 in excess for the saturation of said liquid with gas and 6 is a filter portion and 7 is a check valve for the outlet pipe 8. A supply of raw liquid 10 is connected to the carbon dioxide gas source 9 and the filter portion 6 of the container 1. The gas radiated liquid strikes against the supersonic vibration element which is located in an atmosphere of pressurized carbon dioxide gas separated from the mixture coming up and emitted from the nozzle of the jet pump portion 4.

TABLE I

| | High frequency input to vibration (in watts) | | | | | |
|---|---|---|---|---|---|---|
| | 200 | 400 | 500 | 600 | 700 | 800 |
| Liquid pressure: | | | | | | |
| Normal | 12.8 | 18.0 | 20.2 | 21.1 | 21.6 | 21.6 |
| 4 kg./cm.² | 6.5 | 9.2 | 10.6 | 11.2 | 11.5 | 11.7 |

From the results of this experiment, the following can be seen: (1) Though an increase in the impressed energy on the vibrator causes a corresponding increase in amplitude, the amount of this increase becomes less until at a certain level any further increase in impressed energy causes little or no increase in amplitude. (2) The amplitude decreases sharply when the liquid is put under pressure. For each level of input to the vibrator the amplitude of the radiation plate in the liquid under 4 kg./cm.² pressure is about one half that of the radiation plate in the liquid at atmospheric pressure.

If there is no change in the supersonic vibrator element amplitude, this means there is no change in the extent of cavitation in the liquid. And so it can be seen from (1) above that beyond a certain limit the cavitation effect is unchanged even though the input energy to the vibrator is increased. Now, all else being equal, a decrease in the amplitude of the vibrator element can be supported to mean a decrease in the apparent compressibility of the liquid which we know to contain air and other gases. In other words, such a decrease in amplitude means an increase in the liquid resistance, and from the above-mentioned cavitation theory for the absorption of gas in liquid an increase in the cavitation effect can be expected.

The method comprises putting the liquid under pressure with carbon dioxide gas which has been introduced in the liquid for saturating the same liquid, and then subjecting the liquid together with additional gas which is mixed forcibly with the gas saturated liquid to strike against a supersonic vibration element. After the liquid which has been treated in this way is closed tightly in a reservoir it is then subjected to a small pressure by the release of gas due to the agitation of the liquid at the time of bottling, which exists above the liquid level, but this pressure soon disappears and shows no increase after several hours. When this liquid is shaken violently, it shows a pressure equal to that which was used during treatment with supersonic waves.

This fact supports the contention that the cavitation effect is increased when the liquid for supersonic wave treatment is put under the pressure of carbon dioxide gas. It also indicates that a large number of carbon dioxide particles are absorbed uniformly on the liquid particles as a result of the violent cavitation, the result being that a stable aerosol of the liquid and carbon dioxide gas is formed.

It is evident that this process is very useful when applied to the preparation of various carbonated drinks.

On the other hand, natural untreated water or a solution which consists nearly all of water which has been allowed to stand open to the atmosphere at room temperature normally contains from 3% to 5% air. This dissolved air makes the water more compressible, and by getting into the cavities formed instantaneously during cavitation, it prevents the particles of water being broken down. This air will gather gradually, float to the surface, and escape when the water is subjected to supersonic energy in an open container. But in a pipe or closed apparatus such as a carbonator, this air has no way of escape and is a grave impediment to the formation of a colloid consisting of gas and water particles.

According to the present invention, there is provided a method of preparing carbonated drinks which consists in deaerating liquid for carbonated drinks, absorbing carbon dioxide gas in said deareated liquid under pressure with said gas until said liquid is saturated with said carbon dioxide gas, and forcibly mixing said gas-saturated liquid with additional carbon dioxide gas and subjecting the resulting gas-saturated liquid under pressure to the action of a supersonic vibration element.

The air can be expelled by means of a reduced pressure with, for example, a deaerator, (i.e. a closed vessel for containing liquid for treatment and from which air above the liquid level is sucked out), or by carbon dioxide gas injection with, for example, a carbonator, or it can be expelled by means of a second supersonic wave device.

As to the manner of practicing this invention, appended Table II shows the difference between results obtained when the liquid is subjected to supersonic waves together with additional gas and when it is subjected to the same without additional gas. The figures given in the table are the pressures measured within the bottles in kg./cm.² The raw liquid samples in group (A) of the table were first subjected to deaeration, then put under 3 kg./cm.² pressure with carbon dioxide gas, then subjected to supersonic waves together with additional gas as explained above and are finally bottled under atmospheric pressure. The raw liquid samples of group (B) were first subjected to deaeration, then put under 3 kg./cm.² pressure with carbon dioxide gas, then subjected to supersonic waves simply under 3 kg./cm.² pressure with carbon dioxide gas, and finally bottled under the same gas pressure. The bottles in the "Still" group were allowed to sit without being subjected to impact or vibration. The bottles in the "Agitated" group on the other hand were subjected to violent vibration prior to measurement of their pressure. The current frequency impressed on the vibrator element was 22 kc. The high frequency current input was 500 watts.

TABLE II

|   | Immediately after production | After 30 min. | After 24 Hrs. |
|---|---|---|---|
| A: |  |  |  |
| Still | 0.3 | 0.0 | 0.0 |
| Agitated | 3.0 | 3.0 | 3.0 |
| B: |  |  |  |
| Still | 2.5 | 2.0 | 2.0 |
| Agitated | 2.6 | 2.2 | 2.2 |

As shown above, the process of the present invention causes the carbon dioxide gas to be absorbed very well in the raw liquid, and the rate at which gas is lost is very low. In fact, experiments have shown that 80% of the carbon dioxide stays in the liquid even after the product has stood for 48 hours at room temperature with the bottle cap removed.

Although there is no limit to the degree of pressure under which the liquid and carbon dioxide can be kept during the treatment with supersonic waves, it has been found that the carbon dioxide is sufficiently stabilized by applying 2 to 5 kg./cm.² pressure. This makes the process extremely favorable for bottling carbonating products.

Furthermore, the violent cavitation that accompanies this process has a remarkable destructive effect upon microbes, and the treated liquid is well stabilized. The result is that the product suffers no deterioration for a long time. Draught beer particularly can be produced for long-term preservation by this process.

Conventional carbonated drinks have a certain pungent flavor. However, the products produced by means of the present invention have no disagreeable pungent taste but have a soft, mild and stimulative flavor.

An example of an actual operation using the methods of the present invention is outlined in the following:

Water to which fruit juice and sugar have been added is deaerated by means of reduced pressure. The solution is then put into a conventional carbonator and saturated with carbon dioxide gas. Then, the carbonated solution is passed into an apparatus for treatment with supersonic waves. The apparatus is provided with a magneto-striction vibration element with a high frequency current input of 500 watts, a frequency of 22,000 cycles per second, and an amplitude of 50 microns in air. The carbonated solution is held at 4° C. and is passed through the supersonic wave apparatus at the rate of 1000 l./hr. During the treatment with supersonic waves the liquid is held under 3 kg./cm.² pressure by carbon dioxide gas. After treatment under pressure with supersonic waves the solution is passed out under the same 3 kg./cm.² pressure for bottling as a carbonated drink product.

I claim:
1. In a method of preparing carbonated drinks consisting in mixing a deaerated liquid with carbon dioxide gas, forcibly mixing said gas-saturated liquid with pressurized carbon dioxide gas in a closed area, and submitting the resulting mixture of said gas-saturated liquid and said pressurized carbon dioxide gas as a jet to a supersonic vibration located in a pressurized carbon dioxide gas atmosphere outside said closed area.

2. The method according to claim 1, the gas pressure under which said mixture is submitted to supersonic vibration being from 2 to 5 kg./cm.$^2$.

References Cited

UNITED STATES PATENTS 1,768,158 6/1930 Shields _____ 261—76
2,560,728 7/1951 Lee _____ 99—217 X

FOREIGN PATENTS 289,295 7/1961 Japan.
942,608 9/1948 France.

RAYMOND N. JONES, Primary Examiner
S. B. DAVIS, Assistant Examiner

U.S. Cl. X.R.

261—1